(No Model.)
J. GORMAN.
EXTENSION LEG FOR SCAFFOLD SUPPORTS.
No. 256,998. Patented Apr. 25, 1882.
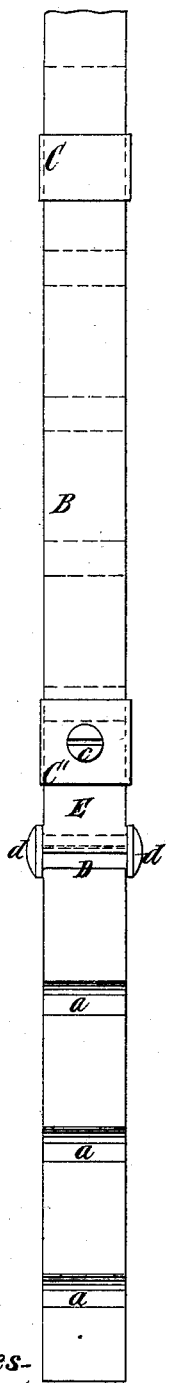 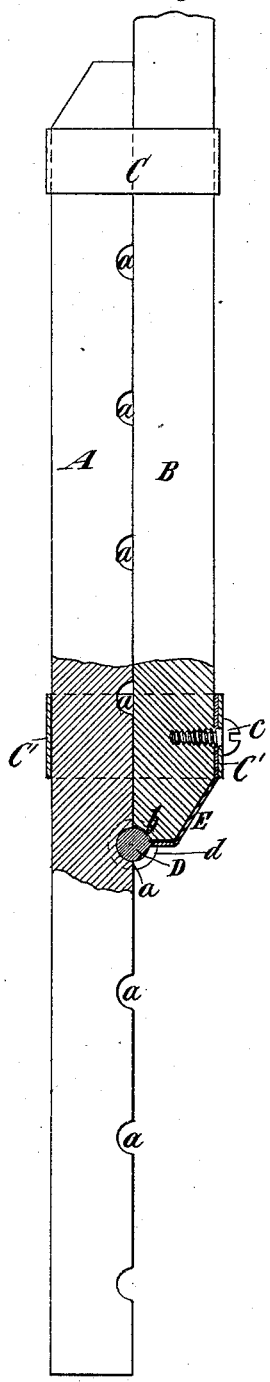 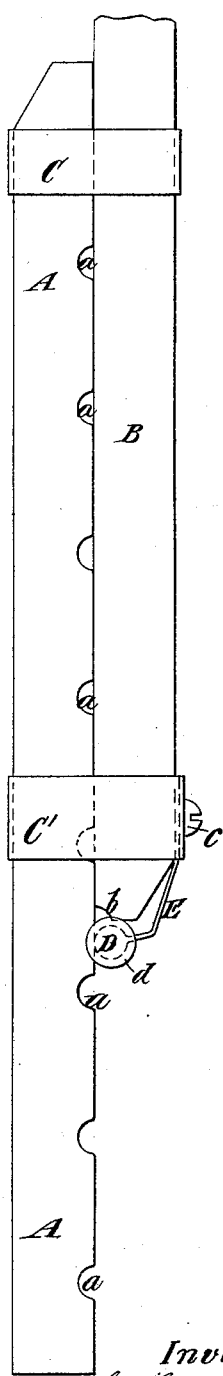
Witnesses- Inventor-

UNITED STATES PATENT OFFICE.

JOSEPH GORMAN, OF ELIZABETH, NEW JERSEY.

EXTENSION-LEG FOR SCAFFOLD-SUPPORTS.

SPECIFICATION forming part of Letters Patent No. 256,998, dated April 25, 1882.

Application filed February 18, 1882. (No model.)

*To all whom it may concern:*

Be it known that I, JOSEPH GORMAN, of Elizabeth, in the county of Union and State of New Jersey, have invented certain new and useful Improvements in Extension-Legs for Scaffold-Supports and other Purposes, of which the following is a specification.

My invention relates particularly to tripod-supports which are used for supporting or carrying a platform of boards to serve as a scaffold for builders and others; but my invention is also applicable to the legs of trestles, easels, and various other articles which are to be made adjustable in height.

The invention consists in the combination, in an extensible leg, of two sections adapted to slide one upon the other, and provided one with a series of notches and the other with a dog or catch, and a leaf or flap spring carrying said dog or catch, as hereinafter particularly described, which will permit of the sections being moved to extend the leg, but which by a reverse movement of the sections will engage with the aforesaid notches, and thus prevent the further contracting of the sections.

In the accompanying drawings, Figure 1 represents a partly-sectional side view of an extensible leg embodying my invention with the sections in fixed relative position after adjustment. Fig. 2 represents a side view showing the two sections in the position they occupy while being adjusted, and Fig. 3 represents an edge view of the leg.

Similar letters of reference designate corresponding parts in all the figures.

A B designate the two leg-sections, which may be of any length desired, and which are adapted to slide one upon the other in face-to-face contact. The sections are prevented from lateral movement relatively to each other by two bands or collars, C C', the former of which may be fast on the section A and adapted to slide upon the section B, while the latter may be fast on the section B and made to allow the section A to slide freely within it. In the face of the section A are formed a number or series of notches, *a*, and the lower end of the section B adjacent to the section A may be provided with a notch, *b*.

A designates a dog or catch which is fast upon the free end of a spring, E, which is inserted under the band or collar C', and held in place by the same screw, *c*, which holds the band or collar C' on the section B; and the dog or catch may have heads or flanges *d* at the ends which receive the section A between them and prevent the dog or catch from shifting endwise. When the section A is moved downward relatively to the section B, or when the latter section is moved upward relatively to the former, the spring E is deflected, as shown clearly in Fig. 2, and the dog or catch rides in and out of the notches *a* without offering any material obstruction to such movements; but if the section A be moved upward or the section B downward the dog or catch D will spring into the first notch, *a*, which presents itself opposite to it, and by the continued movement of the sections the said dog or catch will be carried against or into the notch *b*, and will be so jammed in between the sections that any further movement of either of them in a direction to contract them will be impossible. In the present example of my invention the dog or catch is cylindric and the notches *a* are semicircular; but the dog or catch might be square or of any other form, and in such case the notches should be correspondingly shaped.

It will be readily seen that to extend the leg it is only necessary to draw the section A downward or the section B upward; but when the leg is to be contracted the dog or catch must be drawn back from the section A to allow the notches therein to pass it.

What I claim as my invention, and desire to secure by Letters Patent, is—

1. The combination of the sections A B, provided one with a series of notches and the other with a dog or catch, D, and the leaf or flap spring E, substantially as and for the purpose specified.

2. The combination of the sections A B, provided one with a series of notches, *a*, and the other with a notch, *b*, the dog or catch D, provided with flanges *d*, and the leaf or flap spring E, substantially as and for the purpose specified.

J. GORMAN.

Witnesses:
 FREDK. HAYNES,
 CHANDLER HALL.